(12) United States Patent
Rochell

(10) Patent No.: US 10,750,575 B2
(45) Date of Patent: Aug. 18, 2020

(54) HEATED FLOOR PANEL SYSTEM FOR AN AIRCRAFT

(71) Applicant: Airbus Operations GmbH, Hamburg (DE)

(72) Inventor: Thilo Rochell, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 535 days.

(21) Appl. No.: 15/288,347

(22) Filed: Oct. 7, 2016

(65) Prior Publication Data

US 2017/0105245 A1    Apr. 13, 2017

(30) Foreign Application Priority Data

Oct. 9, 2015  (EP) ..................................... 15189160

(51) Int. Cl.
  *G05B 1/02* (2006.01)
  *H05B 1/02* (2006.01)
  (Continued)

(52) U.S. Cl.
  CPC ............. *H05B 1/0236* (2013.01); *B64C 1/18* (2013.01); *F24D 13/024* (2013.01); *H05B 3/06* (2013.01);
  (Continued)

(58) Field of Classification Search
  CPC ..... B64C 1/18; F24D 13/024; F24D 19/1096; H05B 1/0236; H05B 2203/016; H05B 2203/026; H05B 3/06
  See application file for complete search history.

(56) References Cited

U.S. PATENT DOCUMENTS

| 4,055,777 | A | * | 10/1977 | Black | ................. | G01R 19/0038 |
|  |  |  |  |  |  | 219/69.16 |
| 4,581,522 | A | * | 4/1986 | Graham | .............. | F24D 19/1096 |
|  |  |  |  |  |  | 219/213 |

(Continued)

FOREIGN PATENT DOCUMENTS

EP      2679486      1/2014

OTHER PUBLICATIONS

Extended European Search Report for Application No. 15189160 dated Jan. 29, 2016.

*Primary Examiner* — Ibrahime A Abraham
*Assistant Examiner* — Frederick F Calvetti
(74) *Attorney, Agent, or Firm* — Jenkins, Wilson, Taylor & Hunt, P.A.

(57) ABSTRACT

A heated floor panel system for an aircraft, the floor panel system comprising a floor panel element including a panel structure and a panel heater device, a temperature sensor device for detecting the temperature at the floor panel element, and a connector device connected to the floor panel element, wherein the connector device comprises a power link for providing an electric power connection between the panel heater device and an electric power supply, and a data link for providing a data connection between the temperature sensor device and a control unit. An object of the present disclosure, to provide a floor panel system including a floor panel element which has a possibly simple construction and which can be used independently from the connector device, is achieved in that the temperature sensor device is located in the connector device and connected to the floor panel element via a thermal conductor element.

13 Claims, 2 Drawing Sheets

(51) Int. Cl.
*F24D 13/02* (2006.01)
*H05B 3/06* (2006.01)
*B64C 1/18* (2006.01)
*F24D 19/10* (2006.01)

(52) U.S. Cl.
CPC .... *F24D 19/1096* (2013.01); *H05B 2203/016* (2013.01); *H05B 2203/026* (2013.01)

(56) References Cited

U.S. PATENT DOCUMENTS

| | | | | |
|---|---|---|---|---|
| 4,620,085 A * | 10/1986 | Horikawa | ............. | F24D 13/022 174/51 |
| 4,633,061 A * | 12/1986 | Arikawa | ................ | A47C 7/748 219/202 |
| 5,835,322 A * | 11/1998 | Smith | ...................... | H02H 3/33 361/45 |
| 6,072,152 A * | 6/2000 | Landry | ..................... | B60L 1/02 219/202 |
| 6,691,923 B2 * | 2/2004 | Shearer | ............. | G05D 23/1902 219/501 |
| 6,737,610 B1 * | 5/2004 | Horn | ................... | H05B 1/0272 219/211 |
| 6,834,159 B1 * | 12/2004 | Schramm | ................ | B32B 15/04 392/435 |
| 7,557,330 B2 * | 7/2009 | Shearer | ................. | B64D 13/00 219/213 |
| 8,285,127 B2 * | 10/2012 | Mulder | ..................... | F24D 5/02 392/347 |
| 8,749,928 B2 * | 6/2014 | Fink | ........................ | H02H 3/33 361/42 |
| 2001/0025846 A1 * | 10/2001 | Kochman | .............. | H02H 5/043 219/545 |
| 2003/0065472 A1 * | 4/2003 | Eckel | .................... | H05B 37/02 702/130 |
| 2007/0053188 A1 * | 3/2007 | New | ........................ | A61L 9/20 362/276 |
| 2007/0158501 A1 * | 7/2007 | Shearer | .................. | B64D 13/00 244/118.5 |
| 2008/0083720 A1 * | 4/2008 | Gentile | ................ | A43B 3/0005 219/211 |
| 2014/0097177 A1 * | 4/2014 | Rochell | .................. | G05D 23/19 219/486 |
| 2014/0332521 A1 * | 11/2014 | Shearer | .................. | B64D 13/08 219/494 |
| 2015/0136751 A1 * | 5/2015 | Hanschke | ........... | H05B 1/0275 219/202 |
| 2016/0270153 A1 * | 9/2016 | Duce | .................... | H05B 1/0238 |

* cited by examiner

HEATED FLOOR PANEL SYSTEM FOR AN AIRCRAFT

CROSS-REFERENCE TO RELATED APPLICATION

This application claims priority to European Patent Application No. 15189160.3 filed Oct. 9, 2015, the entire disclosure of which is incorporated by reference herein.

TECHNICAL FIELD

The present disclosure relates to a heated floor panel system for an aircraft, in particular for the cabin floor in the door or galley areas of an aircraft. Also disclosed is an aircraft, comprising the floor panel system according to any of the described embodiments, wherein the floor panel system is installed preferably in a door area or in a galley area of the aircraft.

BACKGROUND

The floor panel system comprises a floor panel element, a temperature sensor device, and a connector device. The floor panel element includes a panel structure for transmitting forces applied to the floor panel, e.g. by passengers, and a panel heater device for heating the floor panel element. The panel heater device may be formed, e.g., as a heater layer, and may preferably be integrated into the panel structure. The temperature sensor device is configured for detecting the temperature at the floor panel element, in particular at one or more specific locations of the panel heater device and/or of the panel structure. The connector device is connected to the floor panel element, preferably from the outset of the floor panel element. The connector device comprises a power link for providing or supporting an electric power connection between the panel heater device and an electric power supply. Further, the connector device comprises a data link for providing or supporting a data connection between the temperature sensor device and a control unit, wherein data may be transferred analog or digitally. Preferably, the control unit relates to the Ice Protection Control Unit (IPCU).

Such floor panel systems are known in the art and commonly used in passenger aircrafts. The known floor panel systems comprise a temperature sensor device which is located inside the floor panel element. The connector device comprises a connector case which is fixedly connected to the floor panel element, and which is connected to the temperature sensor device via internal sensor wiring as well as to the panel heater device via internal heater wiring. The connector device further comprises a power and data cable at its one end fixedly connected to the connector case and at its other end removably connected to the Ice Protection Control Unit. However, such floor panel systems have a rather complicated construction which does not allow that the floor panel element and the connector device can be separated from one another and used independently. When one of the floor panel element and the connector device has to be replaced, e.g. due to a defect or maintenance, the entire floor panel system has to be replaced.

SUMMARY

Therefore, an object of the present disclosure is to provide a floor panel system including a floor panel element which has a possibly simple construction and which can be used independently from the connector device.

This object is achieved by the temperature sensor device being located in the connector device and connected to the floor panel element via a thermal conductor element. In such a way, the temperature of the floor panel element can be detected without the temperature sensor device being located in the floor panel element, simply by thermal conductor element conducting the heat of the floor panel element out to the temperature sensor device provided in the connector device. Not only the temperature sensor device but also the internal sensor wiring can be removed from the floor panel element that way. The floor panel element has a much simpler construction and can much easier be produced and used, independently from the connector device.

According to a preferred embodiment, the connector device is removably connected to the floor panel element. In particular, it is preferred that the connector device is connected to the floor panel element via a plug and socket connection. Such plug and socket connection preferably includes a female part which is arranged on one of the connector device and the floor panel element, and a male part which is arranged on the other of the connector device and the floor panel element, wherein the female and male parts are removably engaging one another. In such a way, the floor panel element and the connector device can easily be removed from one another, so that one of both can be exchanged without influencing the other. For example, when the connector device has a defect, it can simply be plugged out of the floor panel element and be removed or replaced without the floor panel element needing to be replaced, which can save a lot of work during maintenance of the aircraft. Also preferably, the connector device comprises a flange and a screw connection for securing the connector device to the floor panel element.

According to another preferred embodiment thermal conductor element is formed as a pin made of a thermally conductive material, preferably a metal, such as copper. Such a thermally conductive pin may reliably conduct the heat from the floor panel element to the temperature sensor device in the connector device, in order to sufficiently precise detect the temperature at the floor panel element. Further, such a pin-shaped thermal conductor element can simply be plugged in the connector device or in the floor panel element when a removable connection between the floor panel element and the connector device is intended.

According to yet another preferred embodiment thermal conductor element is fixedly connected to the floor panel element and removably connected to the connector device. In particular, thermal conductor element at its one end extends inside the floor panel element in connection to the panel structure and/or the panel heater device, where it is fixedly connected, and at its other end extends inside the connector device in contact to the temperature sensor device, where it is removably connected. In such a way, the connector device does not comprise any projecting parts when it is removed from the floor panel element. However, the fixed and removable connection may also be reversed, so that thermal conductor element is fixedly connected to the connector device and removably connected to the floor panel element.

In particular, it is preferred that the floor panel element comprises at its outside a connector surface for providing an interface to the connector device. Thermal conductor element comprises a panel portion extending from the connector surface to the inside of the floor panel element, where it is preferably fixed, and a connector portion projecting from the connector surface away from the floor panel element. The connector device comprises a thermal conductor recess connected to the temperature sensor device and removably receiving the connector portion, such that the connector portion contacts the sensor device. In such a way, the connector portion is formed as a plug and thermal conductor recess is formed as a socket, which together form a plug-and-socket connection. However, the connector portion and thermal conductor recess might also be arranged reversely, so that the connector portion projects from the surface of the connector device into thermal conductor recess provided in the connector surface of the floor panel element.

Further particular, it is preferred that the floor panel element comprises an electric conductor element having an internal portion extending from the connector surface to the panel heater device, preferably inside the floor panel element, and an external portion projecting from the connector surface away from the floor panel element. Further, the connector device comprises an electric conductor recess connected to the power link and removably receiving the external portion, such that the external portion contacts the power link. In such a way, the external portion is formed as a plug and the electric conductor recess is formed as a socket, so that they together form a plug-and-socket connection. However, the external portion and the electric conductor recess might also be arranged reversely, so that the external portion projects away from the connector device and into the electric conductor recess provided in the connector surface of the floor panel element.

According to a further preferred embodiment, the connector device comprises a connector case, wherein the temperature sensor device, the data link and the power link are arranged at least partially inside the connector case, and wherein the data link is connected to the temperature sensor device, preferably in the connector case. In such a manner, the connector case can be safely touched by a technician and easily be removed from the floor panel element or connected to the floor panel element. Also, the connector case can easily be replaced as such. Preferably, the connector case is removably connected to the floor panel element via a plug and socket connection.

In particular, it is preferred that the connector device comprises a power and data cable arrangement for providing a data connection between the connector case and a control unit, and a power connection between the connector case and an electric power supply. The connector case comprises a cable connector connected to the power and data cable arrangement. Preferably, the power and data cable arrangement is removably connected to the cable connector, so that the connector case and the power and data cable arrangement can be treated as separate units and be replaced separately from one another.

Further, it is preferred that the floor panel system comprises a control unit connected to the power and data cable arrangement and connected to the connector case via the power and data cable arrangement. The control unit comprises an electric power supply and is configured to control the electric power supplied by the electric power supply via the power and data cable arrangement and the power link to the panel heater device, in dependence of temperature data received from the temperature sensor device via the data link and the power and data cable arrangement. The control unit is preferably formed as the Ice Protection Control Unit (IPCU). By the control unit the electric power supplied to the panel heater device and thus the heat generated by the panel heater device can be controlled in dependence of the temperature in the floor panel element as detected by the temperature sensor device.

It is also particularly preferred that the power and data cable arrangement comprises a data cable for transferring data, in particular temperature data, and a power cable for transferring electric power. Via the cable connector the data link is connected to the data cable and the power link is connected to the power cable. In such a way, the power and data cable arrangement provides two separate cables for the transfer of power and data between the control unit and the connector case.

Alternatively, it is preferred that the connector device comprises a power line communication (PLC) adapter unit which connects the data link to the power link so that the data from the temperature sensor device provided by the data link can be transferred via the electric power transferred through the power link. The power line communication adapter unit is preferably arranged in the connector case and can be formed e.g. as a DLAN adapter. The power and data cable arrangement comprises a power cable for transferring electric power, and preferably does not comprise a separate data cable besides the power cable. The power link is connected to the power cable via the cable connector. In this embodiment, the control unit is preferably adapted to receive data via the power cable, e.g. by a related adapter configured to read the transferred data, in particular temperature data, out of the electric power transferred through the power cable. In such a way, no specific data cable is required and the power and data cable arrangement may comprise only one power cable transferring both power and data.

According to a preferred embodiment the power link is connected to a Ground Fault Indicator (GFI) unit configured to detect a fault current in the power link by comparing electric current streaming to and back from the panel heater device. The Ground Fault Indicator Unit is preferably arranged in the connector case. By the Ground Fault Indicator Unit a fault current due to, e.g., a short circuit can be detected and indicated so that the electric power supply can be switched off.

In the case that no power line communication adapter unit is provided, it is particularly preferred that the Ground Fault Indicator Unit comprises an overcurrent generator configured to generate an overcurrent in the power link, which is transferred to the control unit by the power cable, upon detection of a fault current. The control unit is configured to detect the overcurrent and switch off the electric power supply upon detection of the overcurrent. In such a way, the electric power supply can be switched off upon detection of a fault current in order to protect the floor panel system for the embodiment with no PLC adapter unit.

Alternatively, when a power line communication adapter unit is provided, the Ground Fault Indicator Unit preferably comprises a fault signal generator configured to generate a fault signal upon detection of a fault current, and send the fault signal to the control unit via the power link and the power cable. The fault signal generator may thus preferably include a power line communication adapter for adapting the fault signal in order to be transferred via the electric current in the power cable. The control unit is configured to receive the fault signal and switch off the electric power supply upon receipt of the fault signal. In such a way, the electric power supply can be switched off upon detection of a fault current in order to protect the floor panel system, for the embodiment where a PLC adapter unit is provided.

BRIEF DESCRIPTION OF THE DRAWINGS

In the following, preferred embodiments of the disclosure herein are explained in further detail by a drawing. The drawing shows in.

DETAILED DESCRIPTION

Figure 1:
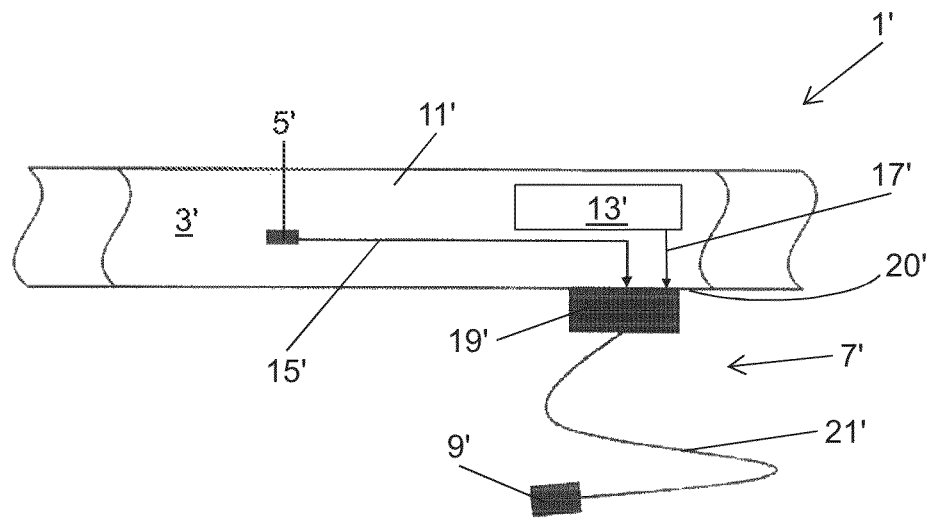
FIG. 1 a floor panel system as known in the art.

In FIG. 1 a prior art heated floor panel system 1' for an aircraft is illustrated. The floor panel system 1' comprises a floor panel element 3', a temperature sensor device 5', and a connector device 7', and a control unit 9'. The floor panel element 3' comprises a panel structure 11' and a panel heater device 13'. The temperature sensor device 5' is provided inside the floor panel element 3' and connected to the connector device 7' by internal sensor wiring 15'. The panel heater device 13' is provided inside or in connection to the panel structure 11' and is connected to the connector device 7' by internal heater wiring 17'. The connector device 7' comprises a connector case 19' which is fixedly connected to the floor panel element 3' at its outside 20', and a power and data cable arrangement 21' connected to the connector case 19' at its one end and to the control unit 9' at its other end.

Figure 2:
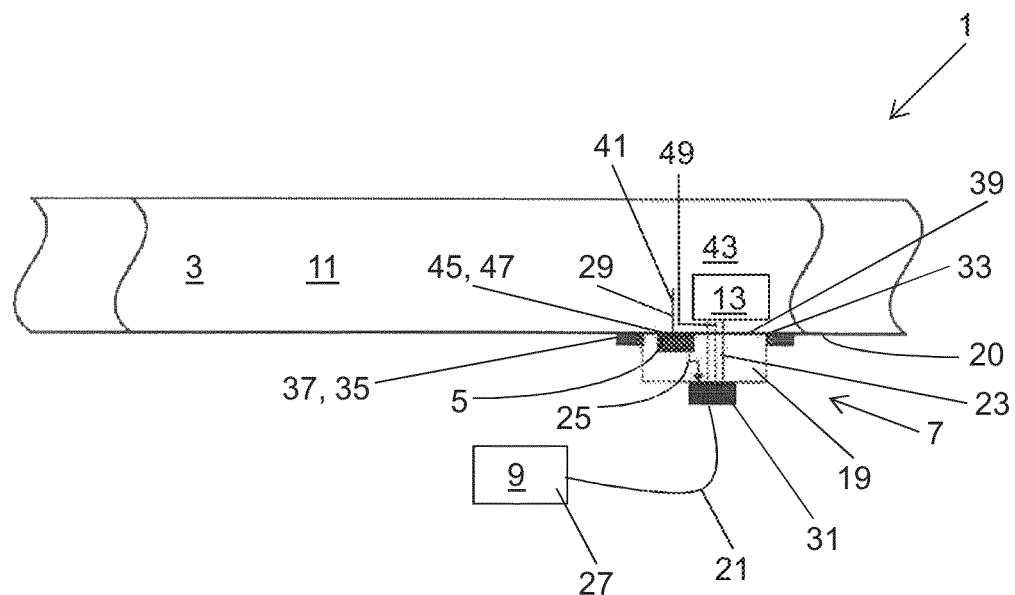
FIG. 2 a schematic diagram of a more general embodiment of the floor panel system according to the present disclosure.

In contrast, FIG. 2 illustrates a heated floor panel system 1 for an aircraft according to the disclosure herein. The floor panel system 1 shown in FIG. 2 represents a more general embodiment that covers both alternative embodiments shown in FIG. 3 and FIG. 4.

Similar to the prior art floor panel system 1' shown in FIG. 1, the floor panel system 1 according to the disclosure herein and shown in FIG. 2 comprises a floor panel element 3, a temperature sensor device 5, a connector device 7, and a control unit 9. The floor panel element 3 includes a panel structure 11 for absorbing forces applied to the floor panel element 3, and a panel heater device 13 in the form of a heater layer included inside the panel structure 11. The temperature sensor device 5 is configured for detecting the temperature at a specific location of the floor panel element 3. The connector device 7 comprises a connector case 19 that is connected to the floor panel element 3 at its outside 20, and a power and data cable arrangement 21 connecting the connector case 19 to the control unit 9. The connector device 7 further comprises a power link 23 and a data link 25 both included in the connector case 19. The power link 23 provides an electric power connection from the panel heater device 13 to the power and data cable arrangement 21 and via the power and data cable arrangement 21 to an electric power supply 27 at the control unit 9. The data link 25 provides a data connection from the temperature sensor device 5 to the power and data cable arrangement 21 and via the power and data cable arrangement 21 to the control unit 9.

In contrast to the prior art floor panel system 1', the floor panel system 1 according to the disclosure herein has the temperature sensor device 5 located in the connector device 7, in particular in the connector case 19, instead of in the floor panel element 3. The temperature sensor device 5 is connected to the floor panel element 3 via a thermal conductor element 29. Thermal conductor element 29 is formed as a metallic pin that conducts the heat from inside the floor panel element 3 to the temperature sensor device 5 in the connector case 19. The power and data cable arrangement 21 is removably connected to the connector case 19 via a cable connector 31 provided at the connector case 19. The connector case 19 is removably connected to the floor panel element 3 via a plug and socket connection 33. The connector case 19 comprises a flange portion 35 including a screw connection 37 for securing the connector case 19 to the floor panel element 3.

Thermal conductor element 29 is fixedly connected to the floor panel element 3 and removably connected to the connector case 19. The floor panel element 3 comprises at its outside 20 a connector surface 39 providing an interface to the connector case 19. Thermal conductor element 29 comprises a panel portion 41 extending from the connector surface 39 to the inside 43 of the floor panel element 3, where it is fixed. Further, thermal conductor element 29 comprises a connector portion 45 projecting from the connector surface 39 away from the floor panel element 3. The connector case 19 comprises a thermal conductor recess 47 connected to the temperature sensor device 5 and removably receiving the connector portion 45 such that the connector portion 45 contacts the temperature sensor device 5. In such a way, the connector portion 45 functions as a plug and thermal conductor recess 47 functions as a related socket.

Further, the floor panel element 3 comprises an electric conductor element 49 having an internal portion 51 extending from the connector surface 39 to the panel heater device 13 inside the floor panel element 3, where it is fixed. The electric conductor element 49 further has an external portion 53 projecting from the connector surface 39 away from the floor panel element 3. The connector case 19 comprises an electric conductor recess 55 connected to the power link 23 and removably receiving the external portion 53 such that the external portion 53 contacts the power link 23. In such a way, the external portion 53 functions as a plug and the electric conductor recess 55 functions as a related socket.

The control unit 9 comprises the electric power supply 27 and is configured to control the electric power supplied by the electric power supply 27 via the power and data cable arrangement 21 and the power link 23 to the panel heater device 13, in dependence of temperature data received from the temperature sensor device 5 via the data link 25 and the power and data cable arrangement 21.

Figure 3:
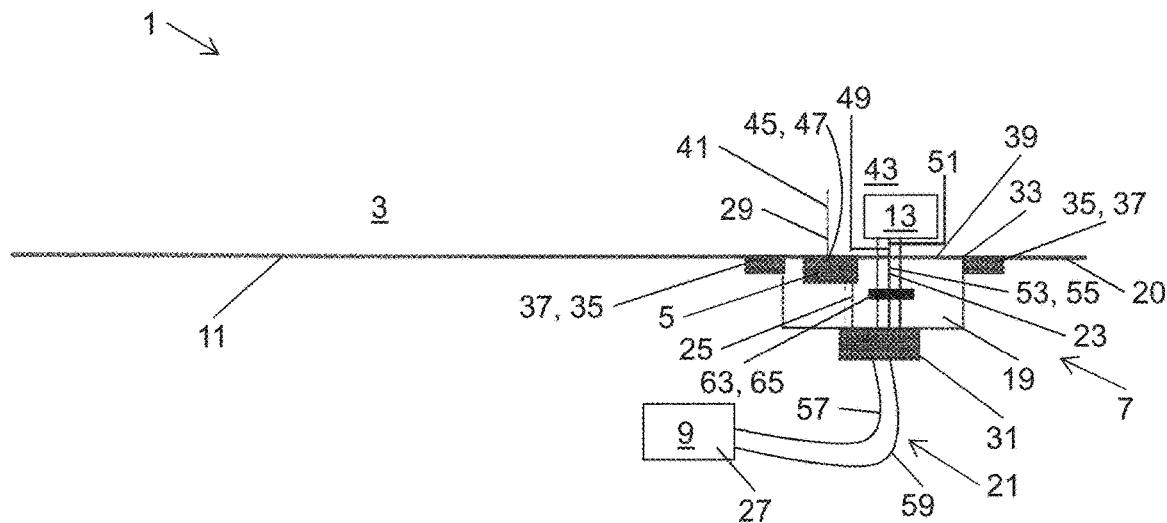
FIG. 3 a detailed schematic diagram of a first alternative embodiment of the floor panel system as shown in FIG. 2.
Figure 4:
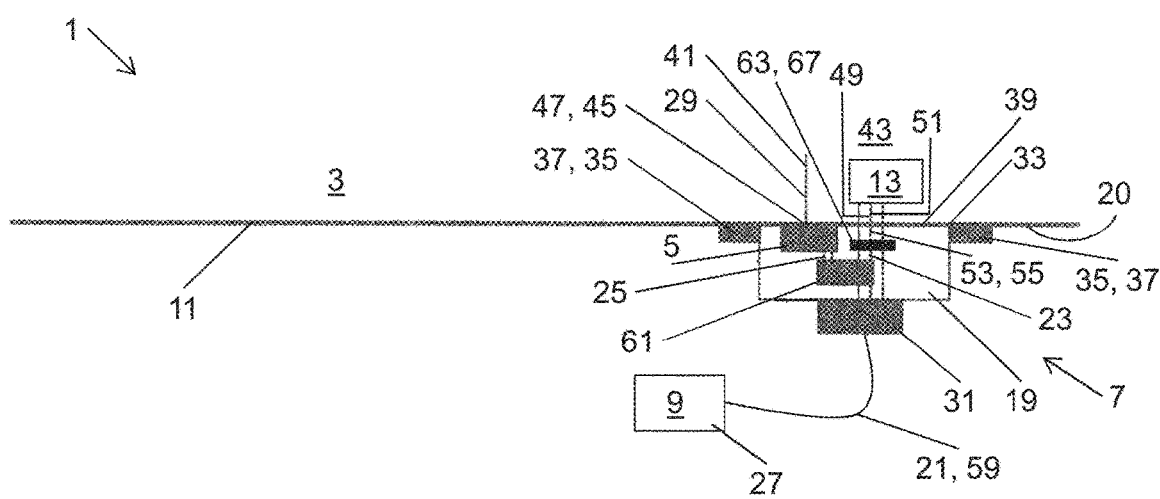
FIG. 4 a detailed schematic diagram of a second alternative embodiment of the floor panel system as shown in FIG. 2.

In FIGS. 3 and 4 two alternative embodiments of the floor panel system 1 of FIG. 2 are illustrated. In the embodiment shown in FIG. 3 the power and data cable arrangement 21 comprises a data cable 57 and a power cable 59, wherein via the cable connector 31 the data link 25 is connected to the data cable 57 and the power link 23 is connected to the power cable 59. Alternatively, in the embodiment shown in FIG. 4 the connector device 7 comprises a power line communication adapter unit 61 which connects the data link 25 to the power link 23, so that data, in particular temperature data from the temperature sensor device 5 provided by the data link 25, can be transferred via the electric power transferred through the power link 23. The power and data cable arrangement 21 comprises only a power cable 59, wherein the power link 23 is connected to the power cable 59 via the cable connector 31, and wherein the control unit 9 is adapted to receive data via the power cable 59.

In both the embodiment shown in FIG. 3 and the embodiment shown in FIG. 4, the power link 23 is connected to a Ground Fault Indicator Unit 63 provided in the connector case 19. The Ground Fault Indicator Unit 63 is configured to detect a fault current by comparing electric current in the power link 23 streaming to and back from the panel heater device 13. In the embodiment shown in FIG. 3 the Ground Fault Indicator Unit 63 comprises an overcurrent generator 65 configured to generate an overcurrent in the power link 23 upon detection of a fault current. Further, the control unit 9 is configured to switch off the electric power supply 27 upon detection of the overcurrent. Alternatively, in the embodiment shown in FIG. 4 the Ground Fault Indicator Unit 63 comprises a fault signal generator 67 configured to generate a fault signal upon detection of a fault current, and send it to the control unit 9 via the power link 23 and the power cable 59. Further, the control unit 9 is configured to switch off the electric power supply 27 upon receipt of the fault signal.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heated floor panel system for an aircraft, the floor panel system comprising:
   a floor panel including a panel heater for heating the floor panel, the floor panel comprising a connector surface on an outer surface of the floor panel;
   a temperature sensor for detecting a temperature at the floor panel; and
   a connector connected to the floor panel, wherein the connector comprises:
      a connector case that is removably connectable to the floor panel at the connector surface, on the outer surface of the floor panel;
      an electric power connection between the panel heater and an electric power supply; and
      a data connection between the temperature sensor and a controller;
   wherein the temperature sensor is located in the connector case;
   wherein the floor panel comprises a thermal conductor in a form of a metallic pin to conduct heat from inside the floor panel to the temperature sensor, the thermal conductor being fixedly connected to the floor panel and removably connectable to the connector case;
   wherein the thermal conductor comprises a panel portion extending, at the connector surface, from the outer surface of the floor panel into the floor panel, such that the panel portion of the thermal conductor is fixed within the floor panel;
   wherein the connector case comprises a thermal conductor recess connected to the temperature sensor; and
   wherein the thermal conductor comprises a connector portion extending, at the connector surface, out from the outer surface of the floor panel out of the floor panel, in a position in which the connector portion is removably receivable within the thermal conductor recess of the connector case so that the connector portion contacts the temperature sensor.

2. The floor panel system according to claim 1, wherein the connector is devoid of any projecting parts when the connector is removed from the floor panel.

3. The floor panel system according to claim 2, wherein the connector is connected to the floor panel via a plug and socket connection.

4. The floor panel system according to claim 1, wherein:
   the floor panel comprises an electric conductor having an internal portion extending from the connector surface to the panel heater and an external portion projecting from the connector surface away from the floor panel, and
   the connector comprises an electric conductor recess that is connected to the electric power connection and removably receives the external portion.

5. The floor panel system according to claim 1, wherein the data connection and the electric power connection are arranged inside the connector case.

6. The floor panel system according to claim 5, wherein:
   the connector comprises a power and data cable arrangement, and
      the connector case comprises a cable connector connected to the power and data cable arrangement.

7. The floor panel system according to claim 6, wherein:
   the controller is connected to the power and data cable arrangement,
   the controller comprises an electric power supply, and
   the controller is configured to control electric power supplied by the electric power supply via the power and data cable arrangement and the electric power connection to the panel heater, based on temperature data received from the temperature sensor via the data connection and the power and data cable arrangement.

8. The floor panel system according to claim 7, wherein:
   the power and data cable arrangement comprises a data cable and a power cable, and
   the data connection is connected to the data cable and the electric power connection is connected to the power cable, respectively, via the cable connector.

9. The floor panel system according to claim 7, wherein:
   the connector comprises a power line communication adapter which connects the data connection to the electric power connection,
   the power and data cable arrangement comprises a power cable, and
   the electric power connection is connected to the power cable via the cable connector.

10. The floor panel system according to claim 1, wherein the electric power connection is connected to a Ground Fault Indicator configured to detect a fault current by comparing electric current streaming to and from the panel heater.

11. The floor panel system according to claim 8, wherein:
   the electric power connection is connected to a Ground Fault Indicator configured to detect a fault current by comparing electric current streaming to and from the panel heater,
   the Ground Fault Indicator comprises an overcurrent generator configured to generate an overcurrent in the electric power connection upon detection of a fault current, and the controller is configured to detect the overcurrent and switch off the electric power supply upon detection of the overcurrent.

12. The floor panel system according to claim 9, wherein:

the electric power connection is connected to a Ground Fault Indicator configured to detect a fault current by comparing electric current streaming to and from the panel heater, the Ground Fault Indicator comprises a fault signal generator configured to generate a fault signal upon detection of a fault current and send the fault signal to the controller via the electric power connection and the power cable, and the controller is configured to receive the fault signal and switch off the electric power supply upon receipt of the fault signal.

13. A heated floor panel system for an aircraft, the floor panel system comprising:

a floor panel including a panel heater for heating the floor panel, the floor panel comprising a connector surface on an outer surface of the floor panel;

a temperature sensor for detecting a temperature at the floor panel; and a connector connected to the floor panel, wherein the connector comprises:

a connector case that is removably connectable to the floor panel at the connector surface, on the outer surface of the floor panel;

an electric power connection between the panel heater and an electric power supply;

a data connection between the temperature sensor and a controller; and a thermal conductor in a form of a metallic pin that is fixedly connected to the temperature sensor and removably connectable to the floor panel, such that, when the thermal conductor is inserted within the floor panel, the thermal conductor is configured to conduct heat from inside the floor panel to the temperature sensor;

wherein the temperature sensor is located in the connector case;

wherein the thermal conductor comprises a panel portion extending outside of the conductor case such that, when the thermal conductor is inserted within the floor panel, the panel portion is located within the floor panel, such that the panel portion of the thermal conductor is fixed within the floor panel;

wherein the connector case comprises a thermal conductor recess connected to the temperature sensor; and wherein the thermal conductor comprises a connector portion extending within the conductor case so that the connector portion is fixed within the thermal conductor recess in a position in which the connector portion contacts the temperature sensor.

\* \* \* \* \*